(12) United States Patent
Pei

(10) Patent No.: US 8,404,372 B2
(45) Date of Patent: Mar. 26, 2013

(54) SAFETY DEVICE FOR USE IN A LITHIUM ION BATTERY

(75) Inventor: Yi Hua Pei, Dongguan (CN)

(73) Assignees: Dongguan Amperex Technology Limited, Dongguan (CN); Dongguan Amperex Electronics Technology Limited, Dongguan (CN)

( * ) Notice: Subject to any disclaimer, the term of this patent is extended or adjusted under 35 U.S.C. 154(b) by 343 days.

(21) Appl. No.: 12/842,016

(22) Filed: Jul. 22, 2010

(65) Prior Publication Data

US 2011/0020675 A1   Jan. 27, 2011

(30) Foreign Application Priority Data

Jul. 24, 2009   (CN) ...................... 2009 2 0061114 U

(51) Int. Cl.
*H01M 2/04* (2006.01)
*H01M 2/08* (2006.01)
*H01M 2/12* (2006.01)

(52) U.S. Cl. ........... 429/56; 429/175; 429/178; 429/179

(58) Field of Classification Search ............. 429/53–56, 429/121–347
See application file for complete search history.

(56) References Cited

U.S. PATENT DOCUMENTS

| | | | | |
|---|---|---|---|---|
| 2007/0128495 | A1* | 6/2007 | Bobowick | 429/35 |
| 2007/0212595 | A1* | 9/2007 | Kim et al. | 429/53 |
| 2009/0148753 | A1* | 6/2009 | Jeon | 429/53 |

FOREIGN PATENT DOCUMENTS

KR   10-2009-0022418   *   3/2009

OTHER PUBLICATIONS

Kim. KR 10-2009-0022418. Mar. 2009. English translation.*

* cited by examiner

*Primary Examiner* — Basia Ridley
*Assistant Examiner* — James Lee

(57) ABSTRACT

A safety device for use in a lithium ion battery includes a top cover defining a central hole and a number of peripheral holes set around the central hole, a rupture plate fixed to the bottom surface of the top cover and sealing the peripheral holes and the central hole, and a vent plate defining an air hole electrically connected to the rupture plate via an electrical connection point. Other part of the rupture plate is electrically insulated from the vent plate via an insulating gasket. The central hole and the peripheral holes around the central hole can prevent the deformed rupture plate from blocking the air vent passage of the lithium ion battery to improve the safety performance of the lithium ion battery.

9 Claims, 3 Drawing Sheets

SAFETY DEVICE FOR USE IN A LITHIUM ION BATTERY

CROSS-REFERENCE TO RELATED APPLICATION

The present patent application claims the benefit of Chinese Patent Application No. 200920061114.1, filed Jul. 24, 2009, the disclosure of which is hereby incorporated herein by reference in its entirety.

FIELD OF THE INVENTION

The present invention generally relates to a safety device for use in a lithium ion battery and, more particularly, to a safety device with desirable safety performance for use in a lithium ion battery.

BACKGROUND OF THE INVENTION

With rapid development of science and technology, portable electronic devices, such as video cameras, laptop computers, portable DVDs, MP4s and digital cameras are becoming increasingly popular in people's daily life. To meet the requirement of being convenient for carrying, lithium ion batteries are widely used as a desirable power source for portable electronic devices.

Lithium ion batteries can supply energy for mobile electronic devices anytime and anywhere. However, due to the use of high-energy chemical materials and energy concentration, safety performance of lithium ion batteries is not satisfactory. For instance, during charge or discharge process of a lithium ion battery, short-circuit possibly occur because of compression, collision or other unexpected incidents, which will inevitably produce large current and generate a lot of heat. The heat accumulation may cause the lithium ion batteries to burn or explode and, therefore, damage the electronic devices and even injure the users.

To improve the safe performance of a lithium ion battery, a safety device is provided on a top cover of the lithium ion battery. The safety device includes a top cover defining an air exhaust hole, a rupture plate electrically connected to a bottom surface of the top cover and sealing the air exhaust hole, a vent plate having an air hole electrically connected with the rupture plate via soldering or riveting, and an insulating gasket for electrically insulating the rupture plate from the vent plate except the soldering point. When the lithium ion battery is overcharged or short-circuited, the expanded air in the lithium ion battery acts on the rupture plate via the air hole and urges the rupture plate to deform upwardly, so as to disconnect the vent plate from the rupture plate and cut off the circuit path. If the air pressure in the lithium ion battery further increase, the rupture plate will break. The air can vent into the surroundings via the air exhaust hole.

However, in the conventional lithium ion battery, there is only one air exhaust hole defined in the top cover. When the rupture plate disconnects from the vent plate, the rupture plate deforms upwardly toward the top cover under the drive of the air pressure. The central portion of the rupture plate may block the air exhaust hole, which may lead to igniting or exploding of the lithium ion battery.

What is needed, therefore, is to provide a safety device with desirable safety performance for use in a lithium ion battery.

SUMMARY OF THE INVENTION

One object of the present invention is to provide a safety device with desirable safety performance for use in a lithium ion battery.

In accordance with an embodiment of the present invention, a safety device for use in a lithium ion battery includes a top cover defining a central hole and a number of peripheral holes around the central hole; a rupture plate fixed to the bottom surface of the top cover and sealing the central hole and the peripheral holes; and a vent plate defining at least one air hole electrically connected to the rupture plate via an electrical connection point, other part of the rupture plate being electrically insulating from the vent plate and the top cover via an insulating gasket.

Preferably, there are at least four peripheral holes disposed around the central hole.

Preferably, the vent plate is formed in a stepped shape and includes an annular fixing portion, a connecting portion extending downwardly and obliquely from the inner edge of the fixing portion, and a planar portion seated at the lower end of the connecting portion.

Preferably, the planar portion of the vent plate forms a thinned portion, the rupture plate includes an annular base portion and a bent portion extending downwardly from the inner edge of the base portion, the bent portion of the rupture plate is electrically connected to the thinned portion of the vent plate.

Preferably, the bent portion of the rupture plate is electrically connected to the thinned portion of the vent plate via riveting or soldering.

Preferably, the insulating gasket is sandwiched between the base portion of the rupture plate and the fixing portion of the vent plate.

Preferably, the insulating gasket includes an upper annular plate, a lower annular plate parallel to the upper annular plate and a vertical connecting plate for connecting the outer edges of the upper annular plate and the lower annular plate. The fixing portion of the vent plate is received in the insulating gasket and the upper annular plate is sandwiched between the base portion of the rupture plate and the fixing portion of the vent plate.

Preferably, the top cover defines a circular recess on a bottom surface thereof, and the recess is in communication with the central hole and the peripheral holes.

Preferably, boundary of the circular recess is the externally tangent circle of the peripheral holes.

According to one embodiment of the present invention, the central hole and the peripheral holes set around the central hole defined in the top cover can prevent the deformed rupture plate from blocking the air vent passage of the lithium ion battery, so as to improve the safety performance of the lithium ion battery.

Additionally, the stepped connecting portion of the vent plate can reduce the effect of the softening of the insulating gasket on the deformation of the rupture plate, so that the rupture plate can break away from the vent plate promptly under the actuation of the air pressure in the lithium ion battery and further cut off the current path.

Other advantages and novel features will be drawn from the following detailed description of preferred embodiment with the attached drawings. The accompanying drawings, which are incorporated in and constitute a part of this specification, illustrate embodiment of the present invention and, together with a general description of the invention given above, and the detailed description of the embodiment given below, serve to explain the principles of the invention:

DETAILED DESCRIPTION OF THE INVENTION

Figure 1:
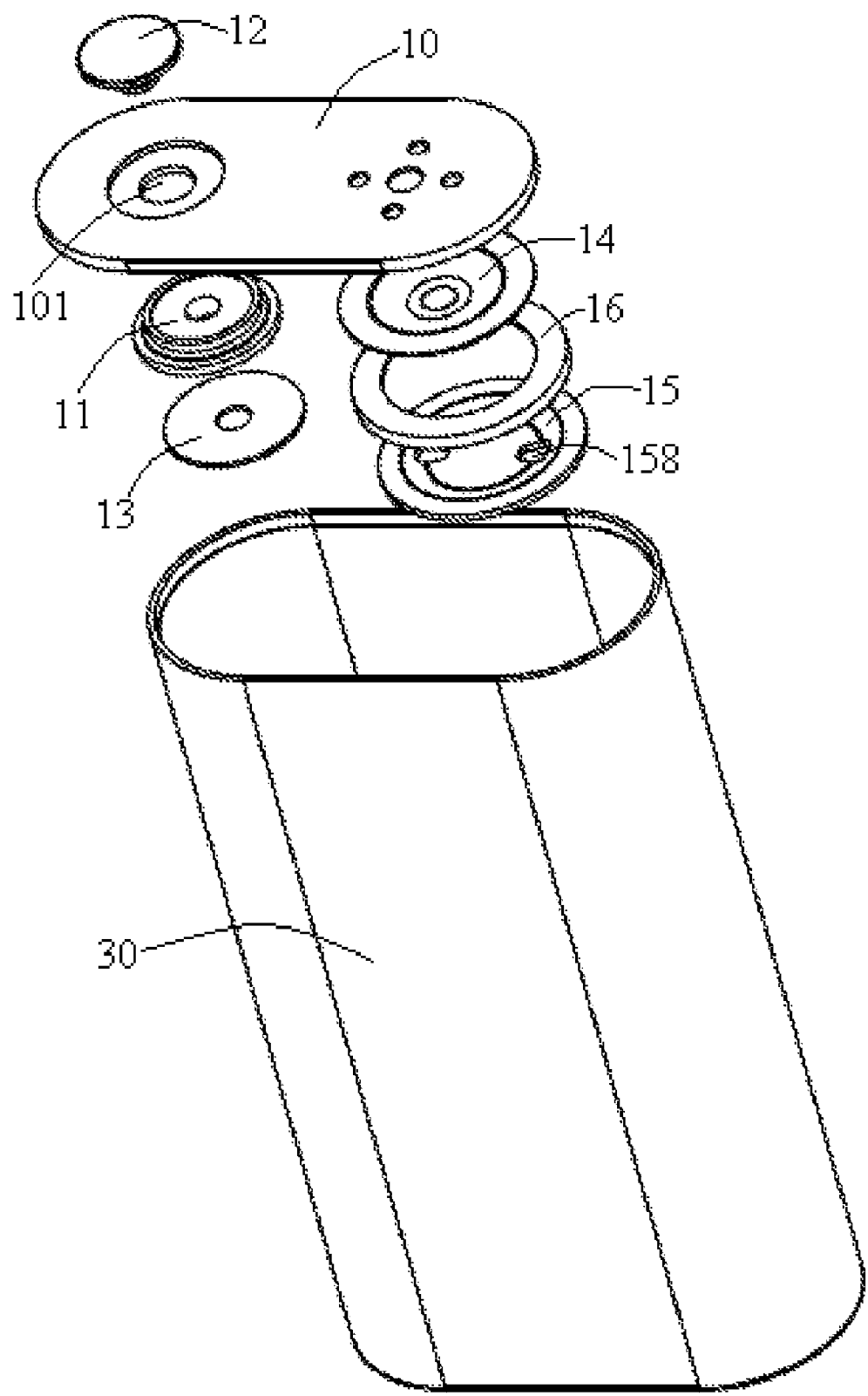
FIG. 1 depicts an exploded view of a lithium ion battery with a safety device according to one embodiment of the present invention, wherein, for the sake of clarity, the battery cell is not shown.
Figure 2:
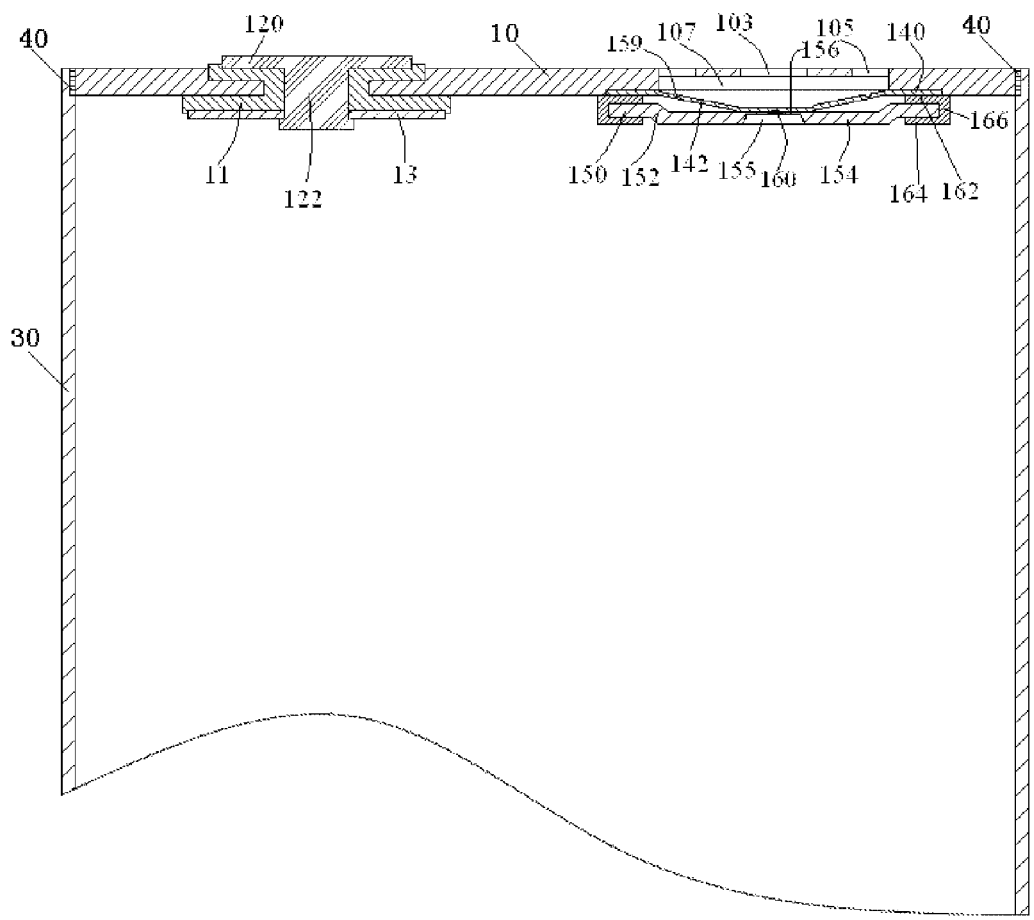
FIG. 2 depicts a cross-sectional view of the assembled lithium ion battery as shown in FIG. 1.
Figure 3:
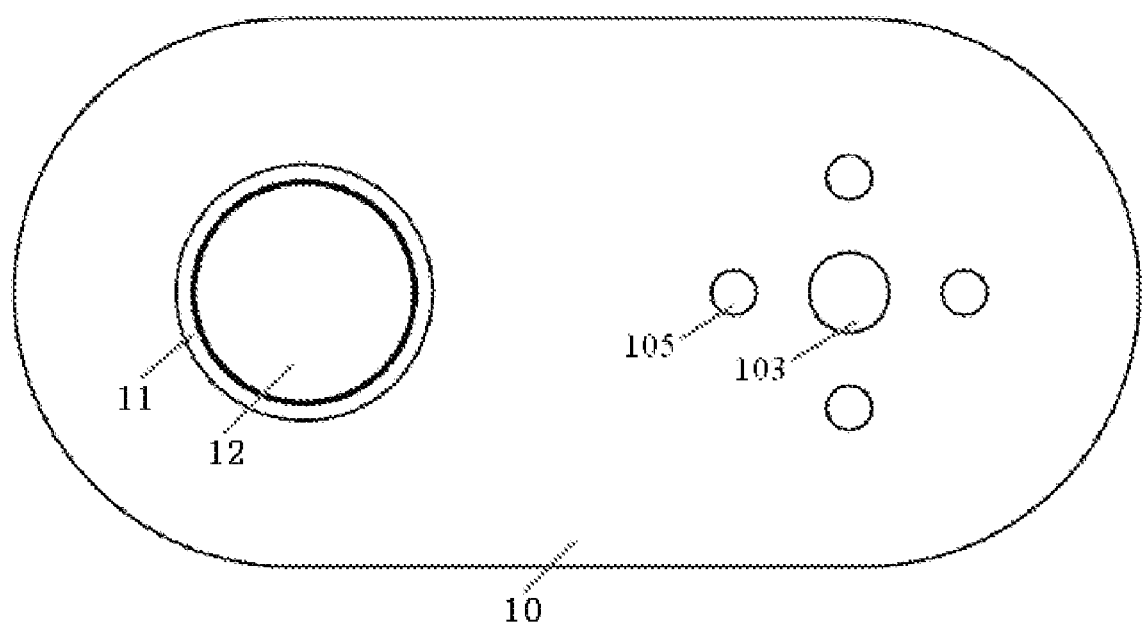
FIG. 3 depicts a top view of the lithium ion battery as shown in FIG. 2.

Referring to FIG. 1 to FIG. 3, a lithium ion battery having a safety device in accordance with one embodiment of the present invention includes a can housing 30, a battery cell (not shown) received in the can housing 30, and a cap assembly coupled to the top of the can housing 30 for sealing the same. The cap assembly includes a safety device and an electrode leading device.

The safety device includes a top cover 10, a rupture plate 14, a vent plate 15 and an insulating gasket 16.

The top cover 10 is an elliptical plate which defines a central hole 103 and a number of peripheral holes 105 around the central hole 103. The number of the peripheral holes 105 can be adjusted according to actual requirement. In the illustrated embodiment, there are four peripheral holes 105 set around the central hole 103. However, according to an alternative embodiment of the present invention, there are more than four peripheral holes 105 evenly disposed around the central hole 103. Bottom surface of the top cover 10 defines a circular recess 107 in communication with the central hole 103 and the peripheral holes 105. The boundary of the circular recess 107 is the externally tangent circle of the peripheral holes 105.

The rupture plate 14 is electrically conductive, which includes an annular base portion 140 and a bent portion 142 extending downwardly from the inner edge of the base portion 140. The inner diameter of the base portion 140 is corresponding to the diameter of the circular recess 107.

The vent plate 15 is a stepped plate which includes an annular fixing portion 150, a connecting portion 152 extending downwardly and obliquely from inner edge of the fixing portion 150, and a planar portion 154 defining at least one air hole 158 seated at the lower end of the connecting portion 152. The bottom surface of the planar portion 154 defines a groove 155 at a center thereof, so as to form a thinned portion 156.

The insulating gasket 16 is made from elastic materials which have desirable elasticity. The insulating gasket 16 includes an upper annular plate 162, a lower annular plate 164 parallel to the upper annular plate 162, and a vertical connecting plate 166 for connecting the outer edges of the upper annular plate 162 and the lower annular plate 164. The inner diameter of the connecting plate 166 is corresponding to the outer diameter of the vent plate 15. The height of the connecting plate 166 is corresponding to the height of the fixing portion 150 of the vent plate 15. The fixing portion 150 of the vent plate 15 can be safely received and fixed in the insulating gasket 16.

In assembly, the bent portion 142 of the rupture plate 14 is corresponding to the circular recess 107 of the top cover 10. The base portion 140 of the rupture plate 14 is soldered on the bottom surface of the top cover 10 via welding. In this case, the center of the rupture plate 14 is registered with the central hole 103 in the top cover 10. The fixing portion 150 of the vent plate 15 is securely received in the insulating gasket 16. The thinned portion 156 of the vent plate 15 is connected to the center of the bent portion 142 of the rupture plate 14 via welding (soldering point 160 in FIG. 2) or riveting to form an electrical connection point. The upper annular plate 162 abuts against the bottom surface of the base portion 140 of the rupture plate 14. According to the illustrated embodiment, the stepped vent plate 15 can reduce the interval between the fixing portion 150 of the vent plate 15 and the top cover 10 to minimize the thickness of the upper annular plate 162 of the insulating gasket 16.

The electrode leading device includes a through-hole 101 defined in the top cover 10, an electrode pole 12 securely received in the through-hole 101, an insulating grommet 11 set around the electrode pole 12 for electrically separating the electrode pole 12 from the top cover 10, and a conductive strip 13 disposed around the electrode pole 12 and abutting against the lower surface of the insulating grommet 11. The T-shaped electrode pole 12 includes a post 122 and a circular top portion 120 at an upper end of the post 122. The post 122 is inserted into the through-hole 101 defined in the top cover 10 and in electrical connection with the conductive strip 13. The insulating grommet 11 is disposed between the post 122 and the top cover 10 to electrically separate the post 122 and the conductive strip 13 from the top cover 10.

In assembly, the battery cell is safely received in the can housing 30. The cap assembly is coupled to the top end of the can housing 30 via a laser welding ring 40 for sealing the same. One lead of the battery cell is electrically connected to the vent plate 15 and further electrically connected to the top cover 10 via the rupture plate 14. The other lead of the battery cell is electrically connected with the electrode pole 12 through the conductive strip 13. In use, the top cover 10 and the electrode pole 12 are electrically connected to the external circuit, respectively.

When the temperature in the lithium ion battery rises because of short circuit during charge or discharge process of the lithium ion battery, the expanded air enters the space between the rupture plate 14 and the vent plate 15 via the air hole 158. When the air pressure exceeds a predetermined value, the bent portion 142 of the rupture plate 14 will deform upwardly. The insulating gasket 16 is very thin and, therefore, the softening of the insulating gasket 16 because of the high temperature almost has no effect on the deformation of the rupture plate 14. The deformation of the bent portion 142 will lead to the break of the thinned portion 156 of the vent plate 15 or the break of the soldering point 160 for connecting the rupture plate 14 and the vent plate 15, so as to cut off the current path. If the air pressure further increases, the rupture plate 14 will rupture along the relief groove 159 defined at the upper surface of the rupture plate 14. The top cover 10 defines a central hole 103 and four peripheral holes 105 around the central hole 103. Even though the rupture plate 14 broken away from the vent plate 15 blocks the central hole 103 or one of the peripheral holes 105, the air in the lithium ion battery still can vent into the surroundings via other unblocked peripheral holes 105 defined in the top cover 10, thereby preventing the lithium ion battery from igniting or exploding.

In view of the description as previously detailed, the central hole 103 and the peripheral holes 105 arranged around the central hole 103 defined in the top cover 10 can prevent the deformed rupture plate 14 from blocking the air vent passage of the lithium ion battery, so as to improve the safety performance of the lithium ion battery.

Additionally, the stepped connecting portion 152 of the vent plate 15 reduces the effect of the softening of the insulating gasket 16 on the deformation of the rupture plate 14, so that the rupture plate 14 can promptly break away from the vent plate 15 under the actuation of the air pressure in the lithium ion battery to cut off the current path.

It should be noticed that, in the illustrated embodiment, the electrode leading device is arranged at the top of the can housing 30. However, according to an alternative embodiment of the present invention, the electrode leading device can also be disposed at the bottom of the can housing 30.

While the present invention has been illustrated by the above description of the preferred embodiment thereof, while the preferred embodiment has been described in considerable detail, it is not intended to restrict or in any way to limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A safety device for use in a lithium ion battery, comprising
    a top cover defining a central hole and a plurality of peripheral holes around the central hole, the top cover being formed with an electrode leading device, the electrode leading device comprising a through-hole defined in the top cover, an electrode pole received in the through-hole, an insulating grommet set around the electrode pole for electrically separating the electrode pole from the top cover, and a conductive strip disposed around the electrode pole and abutting against a lower surface of the insulating grommet;
    a rupture plate fixed to a bottom surface of the top cover and sealing the central hole and the peripheral holes; and
    a vent plate defining at least one air hole electrically connected to the rupture plate via an electrical connection point.

2. The safety device of claim 1, wherein there are at least four peripheral holes disposed around the central hole.

3. The safety device of claim 1, wherein the vent plate is formed in a stepped shape and comprises an annular fixing portion, a connecting portion extending downwardly and obliquely from the inner edge of the fixing portion, and a planar portion seated at the lower end of the connecting portion.

4. The safety device of claim 3, wherein the planar portion of the vent plate forms a thinned portion, the rupture plate comprises an annular base portion and a bent portion extending downwardly from the inner edge of the base portion, and the bent portion of the rupture plate is electrically connected to the thinned portion of the vent plate.

5. The safety device of claim 4, wherein the bent portion of the rupture plate is electrically connected to the thinned portion of the vent plate via riveting or soldering.

6. The safety device of claim 4, wherein the insulating gasket is sandwiched between the base portion of the rupture plate and the fixing portion of the vent plate.

7. The safety device of claim 6, wherein the insulating gasket comprises an upper annular plate, a lower annular plate parallel to the upper annular plate and a vertical connecting plate connecting the outer edges of the upper annular plate and the lower annular plate, the fixing portion of the vent plate is received in the insulating gasket, the upper annular plate is sandwiched between the base portion of the rupture plate and the fixing portion of the vent plate.

8. The safety device of claim 1, wherein the top cover defines a circular recess on the bottom surface thereof and the recess is in communication with the central hole and the peripheral holes.

9. The safety device of claim 8, wherein boundary of the circular recess is the externally tangent circle of the peripheral holes.

* * * * *